United States Patent [19]

Boyer et al.

[11] 4,365,582
[45] Dec. 28, 1982

[54] DIFFERENTIAL PRESSURE SIGNAL DEVICE

[75] Inventors: David C. Boyer, Chicago; William E. Ruehl, Wheeling, both of Ill.

[73] Assignee: Illinois Tool Works Inc., Chicago, Ill.

[21] Appl. No.: 209,445

[22] Filed: Nov. 24, 1980

[51] Int. Cl.³ .................... G01L 19/12; G08B 3/00
[52] U.S. Cl. ........................ 116/70; 116/DIG. 25; 34/89
[58] Field of Search ........ 116/70, DIG. 25, DIG. 42, 116/67 R, 137 R; 55/274, 270; 34/89

[56] References Cited

U.S. PATENT DOCUMENTS

| | | | |
|---|---|---|---|
| 877,581 | 1/1908 | Moore | 116/70 |
| 3,736,900 | 6/1973 | Nowicki | 116/70 |
| 4,091,762 | 5/1978 | Ruehl | 116/70 |

*Primary Examiner*—Steven L. Stephan
*Assistant Examiner*—Denis E. Corr
*Attorney, Agent, or Firm*—Jerold M. Forsberg; Thomas W. Buckman; Jack R. Halvorsen

[57] ABSTRACT

A differential pressure signal device employing an audible vibratory reed assembly having the property of being activated automatically upon being subjected to a predetermined energy level. The assembly is preferably all plastic and includes a unique rockable flapper valve that is automatically activated when the differential in pressure between two chambers reaches a predetermined level. The opening of said valve provides a large inrush of air that activates and operates the audible vibration of said reed until the differential in pressure is lowered below said predetermined level.

10 Claims, 7 Drawing Figures

U.S. Patent  Dec. 28, 1982  4,365,582
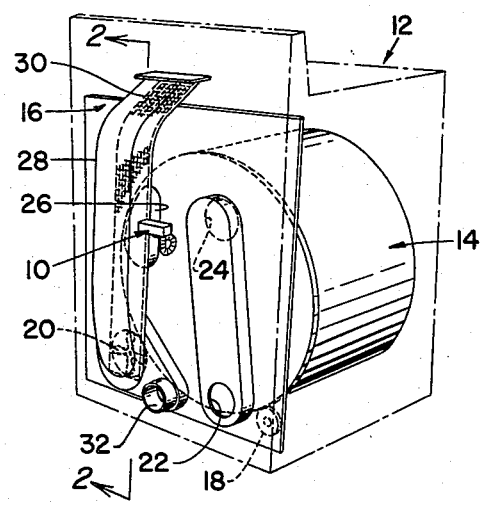
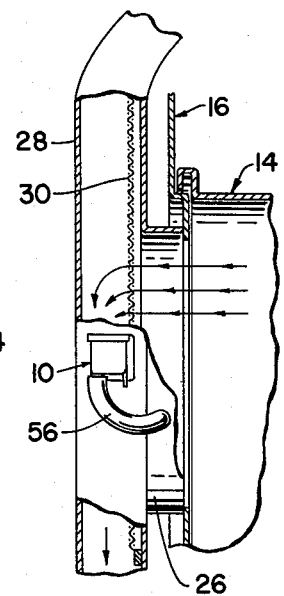
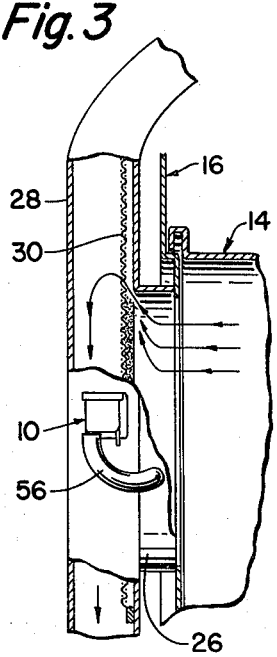
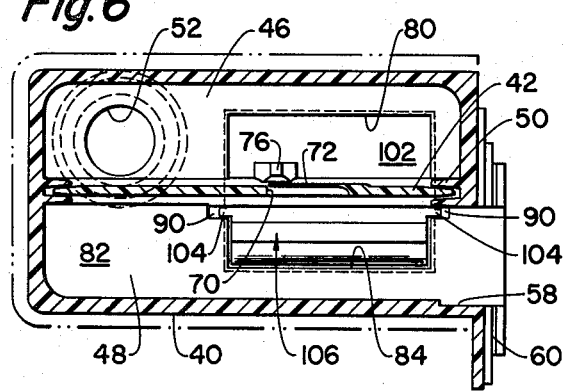
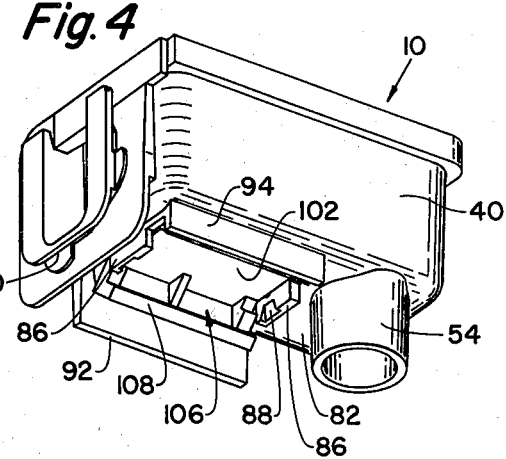
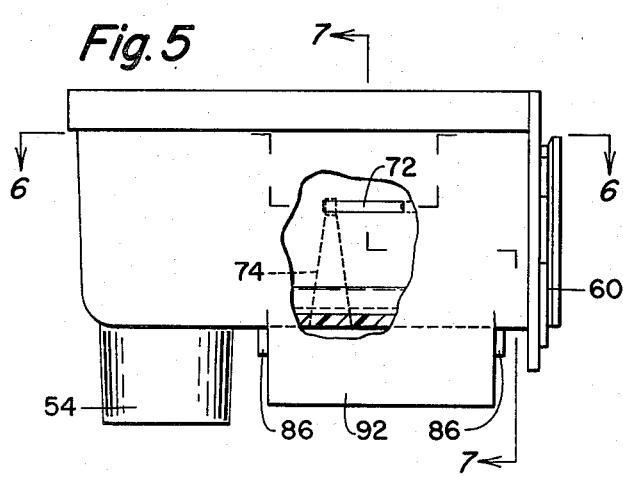
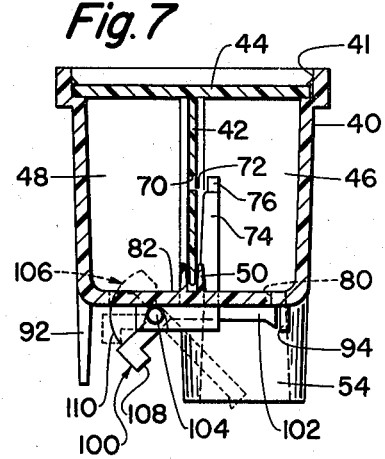

DIFFERENTIAL PRESSURE SIGNAL DEVICE

BACKGROUND OF THE INVENTION

Vibrating reeds for the production of basic sonic tones have been used for centuries in organs, harmonicas and other sound producing devices. Such devices have been used as warning means wherein differentials in pressure created by a clogged filter exist such as are found in vacuum cleaners, furnaces, refrigeration systems and other systems where the passage of air requires a removal of particulates by means of a filter. The present invention was designed for use with a household clothes dryer manufactured by a nationally known producer of such devices. While the present device has many other applications, it will be described as used with this particular clothes dryer. These units are unique in that the horizontal, rotating drum is open at both ends. The after end of the drum is supported by an embossed bulkhead and two rubber tired wheels riding in a spun recessed track. The position of the wheels are strategically located so as to compensate for the forces imposed by a driving belt around the drum. The front end of the drum, having an internal Teflon coated liner bearing, is supported by the front panel of the dryer. Thus, in practicality, the drum is an essentially openended cylinder, belt driven on its periphery, supported on one end by two idler rollers, and on the other end by large diameter plastic bearing.

The air system is a negative pressure system (vacuum) by which a motor driven fan (at the extremity of the system) draws ambient air through a heating duct (gas or electric) into the drum via a grill in the fixed rear bulkhead and then passes through a lint chute via an exit grill in the fixed rear bulkhead. The air then passes through the fan and is discharged through a duct at the lower, rear center of the unit.

The lint chute is a fabricated sheet metal duct connecting the exit grill of the drum area to the fan housing. The chute is fabricated to provide a track which allows the insertion of the lint screen which necessitates the filtering of all air from the drum area before it can exit through the fan and subsequent discharge tube.

Two vacuum conditions exist and change in the dryer. Dynamic vacuum due to the air flow (Venturi effect) diminishes as the screen in the filter fills and also with an increase of back pressure (length of the venting system). Static vacuum (due to the inability of the fan to satisfy itself) increases as the lint screen fills, but decreases with an increase of back pressure.

One such device for use in a system of this type is shown and described in the patent to Ruehl, U.S. Pat. No. 4,091,762, assigned to the common assignee of the present application. In that device a biased reed assembly was utilized to provide an audible alarm in which the reed consisted of a flat large area thin cross-section reed which was biased by distorting its flatness and its normal state of rest or free position with an angular, transverse bridge at its free extremity. The reed was disposed in a plate-like divider in a housing which formed two chambers one of which was subjected to the conditions on the downstream side of the filter while the adjacent chamber was subjected to ambient pressures. Additionally the device made use of a mechanical advantage which utilizes the exponential change in vacuum upstream of the screen to break or dampen the reeds vibration. This was accomplished by attaching a flexible flap to the reed, providing an external suction tube connected to said upstream pressure to pneumatically hold the flap in place and thereby restrict the reed from vibrating until a predetermined differential in pressure was reached. Release of the flap permitted the reed to vibrate in its ambient pressure environment.

Extended testing and use of that device, as shown in U.S. Pat. No. 4,091,762, produced two difficulties: first, it was difficult in manufacturing procedures to control the disposition of the bridge which biased the reed. In many instances this proved to be a highly variable factor and in other situations developed a distortion in the reed per se. Additionally, the cost of manufacture were exceedingly high due to the quality control necessary to produce a viable product that would operate consistently. Additionally, due to the multiplicity of parts and assembly procedures required to produce such a device its cost became prohibitive in the eyes of the ultimate user, namely, the dryer manufacturer.

SUMMARY OF INVENTION

The present invention is directed to a differential pressure signal device which provides an audible alarm to give a signal when a lint screen is approximately two thirds full regardless of whether or not the unit is vented to a point remote from the dryer per se or whether a towel or other clothing is temporarily caught up against the exit grill in the fixed rear bulkhead. The present device bases its operation purely upon the differential pressure as measured between the upstream and downstream side of the filter, both upstream and downstream being of a negative nature and accurately measurable whether they be dynamic vacuum or static vacuum.

An embodiment of the present invention contemplates a housing which is divided into two chambers by an apertured plate-like member having a vibratory reed disposed over said aperture which passes and communicates with the two chambers. The first chamber communicates by a restricted aperture to the upstream side of the filter which is at a negative pressure due to the Venturi effect while the second chamber is connected and communicates with a second pressure source (negative) on the downstream side of the filter. A unique rocking flapper valve mechanism is provided in the bottom wall of the housing and communicates with the first chamber. It is normally held in closed position by two factors, namely, the weight of the activating portion on the opposite side of pivot means as well as the differential in pressure between ambient and the upstream side of the filter Venturi effect negative pressure acting on opposite sides of the valve. When the differential in pressure between the two chambers reaches a predetermined point the ambient pressure acts against the activating side so that the flapper valve rocks and is physically drawn into the second chamber, having the larger negative pressure, and exposes an enlarged aperture in the first chamber to ambient pressure which then activates the reed to produce an audible sound. Suitable means is provided within the housing and located adjacent the free end of the reed and spaced therefrom to control the amplitude of the vibration of the reed and thereby increase the frequency of the reed and its audible sound.

Thus, it is an object of the present invention to produce an audible alarm device capable of producing an instantaneous, suitable, audible sound activated by the presence of predetermined pressure differential conditions.

A further object of the invention is to provide a two chambered device subjected to differing pressure conditions and an automatically operable valve mechanism for subjecting one of the chambers to ambient pressures when the differential in pressures between the chambers reaches a predetermined level.

Still another object of the present invention is to provide further means for controlling the amplitude of vibration of the reed so as to increase its frequency and elevate the ultimate audible sound produced thereby.

Another object of the invention is to provide a simple, economical alarm for use with home appliances to indicate the presence of clogged filter members which should be cleaned, thereby resulting in savings of energy necessary for operation of the device.

Other objects will become apparent to those skilled in the art when the specification is read in conjunction with the attached drawings.

BRIEF DESCRIPTION OF THE DRAWINGS

FIG. 1 is a schematic representation of a home clothes dryer to which the present invention has been applied;

FIG. 2 is a partial sectional view of an installation of the device contemplated by the present invention to a clothes dryer as taken generally along line 2—2 of FIG. 1 showing the flow of air through a filter that is clean;

FIG. 3 is a similar cross sectional view to that shown in FIG. 2 and showing the flow of air when a lint filter has collected lint and when the alarm would be activated;

FIG. 4 is a perspective view of the preferred embodiment of the invention;

FIG. 5 is an elevational view in partial section of the device shown in FIG. 4;

FIG. 6 is a plan view in section taken along line 6—6 of FIG. 5 and;

FIG. 7 is a cross sectional view taken along lines 7—7 of FIG. 5.

DETAILED DESCRIPTION

Referring now to the drawing wherein similar parts are identified by similar numerals, FIG. 1 is a schematic representation of one form of clothes dryer to which the present invention, generally designated by the numeral 10, could be applied. The dryer (12) includes, in this particular model of dryer, a horizontal rotating drum (14), open at both ends, with the after end of the drum supported by the embossed bulkhead (16) and the two rubber tired wheels (18) riding in a spun recessed track. The front end of the drum, not shown, has an internal plastic liner bearing supported by the front panel of the dryer. The air system is a negative pressure or vacuum system by which a motor driven fan (20) draws ambient air through a heating duct (22) into the drum via a grill or opening (24) in the fixed rear bulkhead (16). After circulating around the drum (14) the air is then drawn through an exit grill (26) into the lint chute (28) with an elongated lint filter (30) blocking the passage from grill (26) into the lint chute (28). The heated air is then drawn through the fan (20) and discharged through a duct (32) at the lower rear center of the unit. This duct can be discharged into ambient or be connected to additional duct work for discharge to the exterior of the building in which it is located, as previously described.

Referring now to FIGS. 4 through 7, the preferred embodiment of the differential pressure signal device (10) includes a generally rectangularly shaped chamber case (40) which is open along its top elongated wall and adapted to be associated with a combination one piece reed plate (42) and cover (44). The reed plate divides the case or housing (40) into two chambers (46) and (48) while the cover (44) closes the open wall. The housing (40) includes groove means (50) centrally disposed along its longitudinal axis and up the end walls to accept the reed plate (42) and to generally seal off the chambers (46) and (48) from one another. The first chamber (46) is provided at one end of its lower wall with an aperture (52) and a connecting tubular extension (54) adapted to accept a flexible hose (56) that provides access at its opposite end to the upstream pressure conditions of the filter (30), as seen in FIGS. 2 and 3. The second chamber (48) communicates with a port (58) opening through one end of the chamber in the housing and provided with suitable fastening means (60) for acceptance by angular rotation within a non-circular aperture located in the lint chute (28). Fastening means of this type are shown in the Fisher U.S. Pat. No. 3,443,783, however, it should be recognized that other suitable fastening means such as apertured flanges, screws, adhesives, etc., will be apparent to those skilled in the art.

The reed plate (42) is provided with a longitudinally disposed aperture (70) and an overlying reed (72) that substantially covers the aperture (70). In the preferred embodiment the reed (72) is molded integrally with reed plate (42) but it should be recognized that an independent element forming the reed plate could be utilized without departing from the spirit of the present invention. Such an independent reed could be either metallic or non-metallic, as desired. For efficiencies in manufacture, however, the integrally molded reed (72) is preferred. Integral with the housing (40) is an upwardly extending tapered arm (74) having its upper free end (76) spaced a predetermined distance from and positioned adjacent to the free end of the reed (72). This device serves to limit the amplitude of the vibrations of the reed (72) and to increase the frequency whereby a harmonic pleasant tone is produced by the reed. The arm (74) also generally controls the set off or activation point for the production of audible sound by the reed (72) as it experiences differential pressures on opposite sides thereof.

A unique feature of the present invention resides in the provision of an enlarged aperture (80) in the bottom wall (82) of the housing (40) and located within the first chamber (46); a similar aperture (84) is provided in the bottom wall (82) in the chamber (48). On the exterior of the housing (40) there is provided a pair of spaced opposed retaining elements (86) having lead in surfaces (88) that are directed towards a pair of opposed slot means (90) for purposes set forth hereinafter. The bottom wall (82) also includes along its longitudinal edges a relatively large baffle plate (92) and along the opposite edge a similar but lower height plate (94).

Covering the apertures (80) and (84) and mounted within the supporting members (86) is a controlled flapper valve means (100) which includes a generally rectangular plate (102) that is slightly greater than the dimensions of aperture (80) and adapted to cover and seal aperture (80). Along an axis parallel to reed plate (42) and one edge of plate (102) are a pair of pintles (104) adapted to be mounted in complimentary relation to the slots (90). The pintles (104) can be mounted in the slots (90) by snap movement over the ramped surfaces (88) in support elements (86). On the opposite side of the longitudinal axis in which pintles (104) are disposed is a weighted element (106) which in its normal condition maintains the plate (102) in closed relationship to the aperture (80). Element (106) includes a weighted portion (108) and a curved portion (110) that has a radius of curvature substantially equal to the distance from the pintle (104) to the remote longitudinal edge of the aperture (84) whereby when the device swings it will maintain a substantially closed relationship with the aperture (84), for purposes best set forth hereinafter. When the term "weighted portion" (108) is used in this context it is not necessarily meant that there are additional weights added, but rather, the portion (108) along with the curved portion (110) has adequate mass to maintain the plate (102) in closed position, as seen in solid line in FIG. 7 when it is in a normal state of rest. Additionally it has an added relationship which will be described hereinafter.

The present invention, as was previously stated, is directed to a device capable of measuring the differential in pressure across the filter screen (30). It is not concerned, as was the device disclosed in U.S. Pat. No. 4,091,762, with other external features, i.e. the length of venting tube attached to discharge (32) or the consequences of clothing or toweling striking the grill (26) in the rear of the drum (14). When the dryer (12) is activated, as was previously described, there is a slight negative pressure on the upstream side of the filter which is sensed by the tube (56) and the aperture (52) as they communicate with the first chamber (46). When the filter screen (30) is clean, as seen in FIG. 2, both chambers (46) and (48) will experience approximately the same negative pressure and the reed (72) remains in a stable condition. However, when the filter screen (30) builds up with lint, as seen in FIG. 3, the pressure experienced by chamber (48) will exceed, in a negative sense, the pressure experienced by chamber (46) due to the demand of the fan (20) as it draws a greater vacuum on the downstream side of the filter screen (30). When this differential in pressure exceeds a predetermined level ambient air will act against the control portion (106) of the flapper valve (100) causing that portion, as viewed in the left hand side of FIG. 7, to rotate upwardly into chamber (48) and bring the plate (102) that normally closes aperture (80), into the position shown in dotted lines in FIG. 7. This exposes chamber (46) to a large inrush of ambient pressure air which causes the reed (72) to be activated and produce a tonal quality that is audible to the operator and indicating that the filter screen (30) requires cleaning. It will be appreciated that in the normal state of rest and with a clean filter that the slight negative pressure experienced in chamber (46) through its connecting tube (56) on the upstream of the filter (30) will cooperate with ambient pressure to ensure that the plate (102) remains in a sealed relation. As was explained above, however, when the differential in pressure exceeds a predetermined level the ambient pressure will act against the control means (100) causing the flapper valve to rock into the open position shown in phantom in FIG. 7. The size and amount of mass that is located in the portion (106) and (108) can be utilized to determine the level at which this audible alarm will be activated. It will be appreciated that the walls (92) and (94) serve the function of protecting the moving mechanism of control element (100) so that it is free from external interference that would preclude its freedom of motion.

In the embodiment disclosed the housing or chamber case as well as the reed plate and cover assembly are generally injection molded of thermoplastic materials suitable for the environment in which they are to be used. The controlled flapper valve (100) is similarly preferably injection molded although it, as well as the chamber case and reed plate, could be fabricated of die cast or sheet metal material. While the reed (72) has been indicated as being integrally molded with the reed plate (42) it will be appreciated that other metallic or non-metallic non-integral reeds could be used. The cover (44) is shown as being integral with reed plate (42) and seated in a flanged portion of housing (40) and sealed therein, as at (41), by heat sealing, adhesives or other suitable force-fit relationships. The choice of materials which are available now or in the future will be apparent to those skilled in the art, of course, such choice being dependent upon the environment within which the audible differential pressure signal device is to be used.

I claim:

1. A differential pressure signal device including a housing, an apertured plate-like member dividing said housing into two chambers, limited aperture means in said housing for exposing one of said chambers to a first pressure source, means connecting the other of said chambers to a second pressure source which may vary between being equal to or less than said first pressure source whereby a differential in pressure between said two chambers may exist when said second pressure source is less than said first pressure source, a resilient elongated flat reed fixed at one end to said plate-like member and adapted to overlie the aperture therein, means adapted to be controlled for exposing said one of said chambers to ambient pressure when the differential in pressure between said two chambers reaches a predetermined level, said means for exposing includes a second aperture in said one of said chambers and a controlled flapper valve means normally closing said second aperture until said differential in pressure reaches said predetermined level at which time said valve means opens and exposes said one of said chambers to ambient pressure, whereby said reed is adapted to provide an audible signal in response to when said differential in pressure reaches said predetermined level.

2. A signal device of the type claimed in claim 1, wherein said device is fabricated of plastic material.

3. A signal device of the type claimed in claim 1, wherein said second aperture in said one of said chambers is larger than said limited aperture means.

4. A signal device of the type claimed in claim 3, wherein said valve means includes a generally flat portion of a size adequate to cover and close said second aperture, pivot means located along one edge of said flat portion and disposed generally parallel to the plane of said plate-like member, activating means disposed on the opposite side of said pivot means and exposed on opposite sides thereof respectively to ambient pressure and said second pressure source to thereby control and open said flapper valve upon reaching said predetermined level of pressure differential whereby said reed is activated to produce its audible alarm.

5. A signal device of the type claimed in claim 4, wherein said other chamber includes another aperture in a bottom wall, said activating means includes a body portion substantially filling said another aperture in all angular positions of said valve means, said body portion being moved upwardly through said bottom wall into said second chamber when said predetermined level of pressure differential is reached and drops downwardly automatically when said pressure differential drops below said predetermined level thereby automatically moving said flat portion back into its initially closed position.

6. A signal device of the type claimed in claim 2, wherein said reed is molded integrally with said plate-like member.

7. A signal device of the type claimed in claim 6, wherein said housing includes means mounted in predetermined spaced relation to said reed adjacent its free end and adapted to restrict the amplitude of said reed's vibrations and thereby increase its frequency with the inherent increase in audible sound.

8. A signal device of the type claimed in claim 4, wherein said valve pivot means includes integral pintle means extending outwardly in opposite directions and said housing includes means for acceptance of said pintle means to mount said flat portion and activating means in predetermined relationship to said chambers.

9. A signal device of the type claimed in claim 3, wherein said limited aperture means supplies a predetermined adequate volume of air to said second chamber without actuation of said reed when said differential in pressure is below said predetermined level, said enlarged second aperture being substantially larger in size then said limited aperture whereby when said flapper valve is opened said one of said chambers is supplied with adequate ambient air to actuate said reed.

10. A signal device of the type claimed in claim 1, wherein said one of said chambers is connected to the upstream side of a filter medium and said other of said chambers is connected to the opposite downstream side of said filter medium, said opposite side of said filter being exposed to a negative pressure source, said pressure differential being created by reduction in air flow through said filter medium as waste material is collected thereon and said audible alarm being activated when said filter medium requires cleaning.

* * * * *